(12) United States Patent
Ashmore

(10) Patent No.: US 7,418,621 B2
(45) Date of Patent: Aug. 26, 2008

(54) REDUNDANT STORAGE ARRAY METHOD AND APPARATUS

(75) Inventor: Paul Andrew Ashmore, Longmont, CO (US)

(73) Assignee: Dot Hill Systems Corp., Carlsbad, CA (US)

( * ) Notice: Subject to any disclaimer, the term of this patent is extended or adjusted under 35 U.S.C. 154(b) by 533 days.

(21) Appl. No.: 11/066,052

(22) Filed: Feb. 24, 2005

(65) Prior Publication Data

US 2006/0190763 A1    Aug. 24, 2006

(51) Int. Cl.
*G06F 11/00* (2006.01)

(52) U.S. Cl. .................. 714/6; 714/5; 714/7; 714/8; 714/42; 711/114

(58) Field of Classification Search ............... 714/5, 714/6, 7, 8, 42; 711/114
See application file for complete search history.

(56) References Cited

U.S. PATENT DOCUMENTS

| | | | |
|---|---|---|---|
| 5,463,758 A | 10/1995 | Ottesen | |
| 5,519,844 A | 5/1996 | Stallmo | |
| 5,657,468 A | 8/1997 | Stallmo et al. | |
| 5,708,769 A | 1/1998 | Stallmo | |
| 6,079,029 A | 6/2000 | Iwatani et al. | |
| 6,154,854 A | 11/2000 | Stallmo | |
| 6,425,052 B1* | 7/2002 | Hashemi | 711/114 |
| 6,487,636 B1 | 11/2002 | Dolphin et al. | |
| 6,513,093 B1 | 1/2003 | Chen et al. | |
| 6,557,075 B1 | 4/2003 | Maher | |
| 6,591,338 B1 | 7/2003 | Horst et al. | |
| 6,591,339 B1* | 7/2003 | Horst et al. | 714/6 |
| 6,728,832 B2 | 4/2004 | Yamamoto et al. | |
| 7,143,234 B2* | 11/2006 | Nalawadi et al. | 714/6 |
| 7,143,259 B2* | 11/2006 | Dalal et al. | 711/170 |
| 2003/0033477 A1* | 2/2003 | Johnson et al. | 711/114 |
| 2006/0206662 A1* | 9/2006 | Ludwig et al. | 711/114 |

OTHER PUBLICATIONS

Patterson et al., "A Case for Redundant Arrays of Inexpensive Disks (RAID)," Univ. of California, Berkeley, California, pp. 109-116, 1988.

* cited by examiner

*Primary Examiner*—Robert W Beausoliel, Jr.
*Assistant Examiner*—Joseph D Manoskey
(74) *Attorney, Agent, or Firm*—Sheridan Ross P.C.

(57) ABSTRACT

The present invention is directed to a data storage system utilizing a number of data storage devices. Each of the data storage devices stores primary and mirrored copies of data. Furthermore, the data is arranged such that no one data storage device stores both the primary and mirrored copies of the same chunk of data. Data may be striped across the storage devices such that stripes containing primary copies of data chunks are interleaved with stripes containing mirrored copies of data chunks.

20 Claims, 6 Drawing Sheets

REDUNDANT STORAGE ARRAY METHOD AND APPARATUS

FIELD OF THE INVENTION

The present invention is directed to providing data storage. In particular, the present invention is directed to providing fault tolerant data storage with enhanced data access performance.

BACKGROUND OF THE INVENTION

The need to store digital files, documents, pictures, images and other data continues to increase rapidly. In connection with the electronic storage of data, systems incorporating more than one storage device have been devised. In general, using a number of storage devices in a coordinated fashion in order to store data can increase the total storage volume of the system. In addition, data can be distributed across the multiple storage devices such that data will not be irretrievably lost if one of the storage devices (or in some cases more than one storage device) fails. An additional advantage that can be achieved by coordinating the operation of a number of individual storage devices is improved data access and/or storage times. Examples of systems that can provide such advantages can be found in the various RAID (redundant array of independent disks) levels that have been developed.

For instance, RAID level 0 implements a striped disk array in which data is broken into blocks or strips that are written to separate disk drives. This has the effect of improving the data access and storage times as compared to, for example, a system in which all of the data blocks are stored on a single disk drive, by spreading the individual input/output (IO) requests across a number of physical devices. Furthermore, RAID level 0 can be implemented with two or more disk drives. However, RAID level 0 is not fault tolerant. That is, a failure of even one storage device within a RAID level 0 array results in the irretrievable loss of data from that array.

RAID level 1 is an example of a fault tolerant RAID scheme. According to RAID level 1, data stored in a primary drive is mirrored on a secondary drive. Accordingly, RAID level 1 requires at least two drives to implement. Furthermore, if more than two drives are desired, additional drives are added in pairs. That is, RAID level 1 requires an even number of disk drives. During normal operation, read operations are made with respect to the primary copy of data on the primary drive, and write operations result in a primary copy of data being written to the primary drive and a mirrored copy being written to the secondary drive. If one disk drive within a RAID level 1 array fails, data stored on that drive can be rebuilt onto a replacement disk drive by copying the data stored on the failed drive's companion drive to the replacement drive. However, RAID level 1 does not provide improved IO performance as compared to storing data on a single disk drive. Furthermore, because the write transaction rate during normal operation is doubled, certain implementations of RAID level 1 can result in decreased performance as compared to storing data on a single disk drive.

Another example of a storage array is RAID level 0+1. In general, RAID level 0+1 comprises paired RAID level 0 arrays. As a result, data can be striped across multiple drives, improving IO performance. By striping copies of the data across additional disk drives, redundancy is provided. The disadvantages of RAID level 0+1 include the minimum requirement of four disk drives and the need to maintain an even number of drives in arrays incorporating more than four disk drives.

In RAID level 1+0 two or more drives are mirrored together, and then the mirrors are striped together. Like RAID levels 1 and 0+1, a RAID level 1+0 configuration provides fault tolerance if one drive from a disk set is lost. However, the IO performance of a RAID 1+0 array is not as good as a striped array without mirroring, such as RAID level 0.

Other RAID levels combine independent data disks with parity, either stored on a dedicated parity disk or distributed among data disks. Examples of such arrangements include RAID levels 3, 4, 5 and 6. Although such arrangements provide for fault tolerance, and can provide somewhat improved IO performance, they all require at least three drives to implement, and require fairly complex controller and parity generation circuitry or software.

SUMMARY OF THE INVENTION

The present invention is directed to solving these and other problems and disadvantages of the prior art. In accordance with embodiments of the present invention, a storage system utilizing a number of storage devices that provides fault tolerance and improved input/output (IO) performance as compared to conventional mirrored storage arrangements is provided.

A storage system in accordance with embodiments of the present invention includes two or more data storage devices, such as hard disk drives. Data is stored on the storage devices in strips or chunks. In addition, the chunks of data stored in the system are distributed among the storage devices such that each storage device contains chunks comprising primary copies of data and chunks comprising secondary or mirrored copies of data. Furthermore, the primary and mirrored chunks of data are distributed among the storage devices such that each primary chunk of data is stored on a different physical storage device than the mirrored copy of that chunk of data. In accordance with still other embodiments of the present invention, the chunks of data may be stored in strips having a size corresponding to a defined data chunk size such that a stripe of data across all of the storage devices and corresponding to a first strip on those storage devices contains a primary copy of data. A next strip on each of the storage devices comprising a next stripe across all of the storage devices contains a mirrored copy of the data stored in the preceding stripe, but arranged such that the primary and mirrored copies of any one chunk of data exist on different storage devices.

In accordance with still other embodiments of the present invention, a method for storing data among a number of storage devices is provided. According to such embodiments, data is divided into chunks, with a primary copy and secondary or mirrored copy of each chunk written to strips on different storage devices. More particularly, the data is distributed such that each storage device contains both primary and mirrored copies of different data chunks. In addition, no one storage device contains both the primary copy and the mirrored copy of any one chunk of data. In accordance with still other embodiments of the present invention, the data chunks are striped across the storage devices, such that a strip or logical partition of a storage device that contains a primary copy of a chunk of data is followed by a strip that contains a mirrored copy of a chunk of data. Furthermore, such interleaving of primary and mirrored data chunks can extend across all of the storage devices, such that stripes containing either primary copies or mirrored copies of data chunks are formed across the number of storage devices. If one storage device within an array should fail, data that was stored on the failed storage device can be copied to a replacement storage device from other storage devices in the array.

Additional features and advantages of the present invention will become more readily apparent from the following description, particularly when taken together with the accompany drawings.

DETAILED DESCRIPTION

Figure 1:
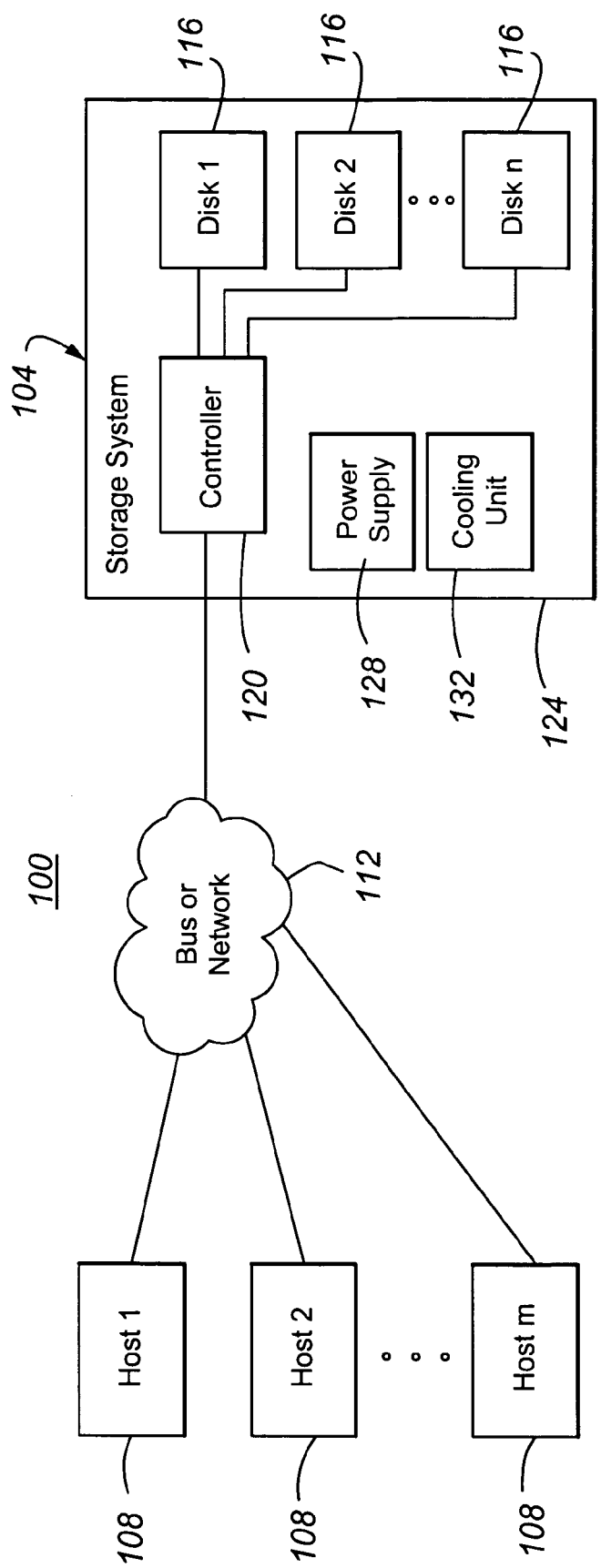
FIG. 1 is a functional block diagram of an electronic data system incorporating a data storage system in accordance with embodiments of the present invention.

FIG. 1 is a functional block diagram of an electronic data system 100 incorporating a data storage system 104 in accordance with embodiments of the present invention. In general, the data storage system 104 may be interconnected to one or more host processors or computers 108 interconnected to the data storage system 104 by a bus and/or network 112. Accordingly, embodiments of the present invention have applications in association with single or multiple hosts 108 in storage area network (SAN) or direct connect environments.

The data storage system 104 generally includes a number of storage devices 116. More particularly, the storage system 104 includes two or more storage devices 116. Furthermore, as will be described in greater detail elsewhere herein, embodiments of the present invention may include odd numbers of data storage devices 116, as well as even numbers of such devices 116. As an example, the storage devices 116 may comprise, but are not limited to, hard disk drives, such as serial advanced technology attachment (SATA), small computer system interface (SCSI), fiber channel (FC) or parallel advanced technology attachment (PATA) hard disk drives. Other examples of storage devices 116 include magnetic tape storage devices, optical storage devices or solid state disk devices.

In accordance with embodiments of the present invention, a data storage system 104 may also include a controller 120 to control the flow of data between the bus or network 112 112 and the storage devices 116. Accordingly, the controller 120 may comprise a controller or adapter that allows the storage devices 116 provided as part of the data storage system 104 to appear as a single storage device to a host 108. Therefore, the controller 120 may function like a RAID controller in a conventional RAID storage device, except that the controller 120 implements the data distribution arrangement described herein. In addition, the controller 120 may provide a communication interface with the bus or network 112. Alternatively, a communication interface may be separately provided. As can be appreciated by one skilled in the art and after consideration of the description provided herein, a controller 120 function of distributing data (or retrieving data) from storage devices 116 may be provided by software running on a host 108 or other external processing, in which case the controller 120 physically provided as part of a data storage system 104 may simply comprise a communication interface with the bus or network 112.

In accordance with still other embodiments of the present invention, the storage system 104 may additionally comprise an enclosure 124 housing the storage devices 116, the controller 120 and any additional components. Such additional components may include one or more power supplies 128 and one or more cooling units 132. However, such additional components are generally not required by embodiments of the present invention.

Figure 2:
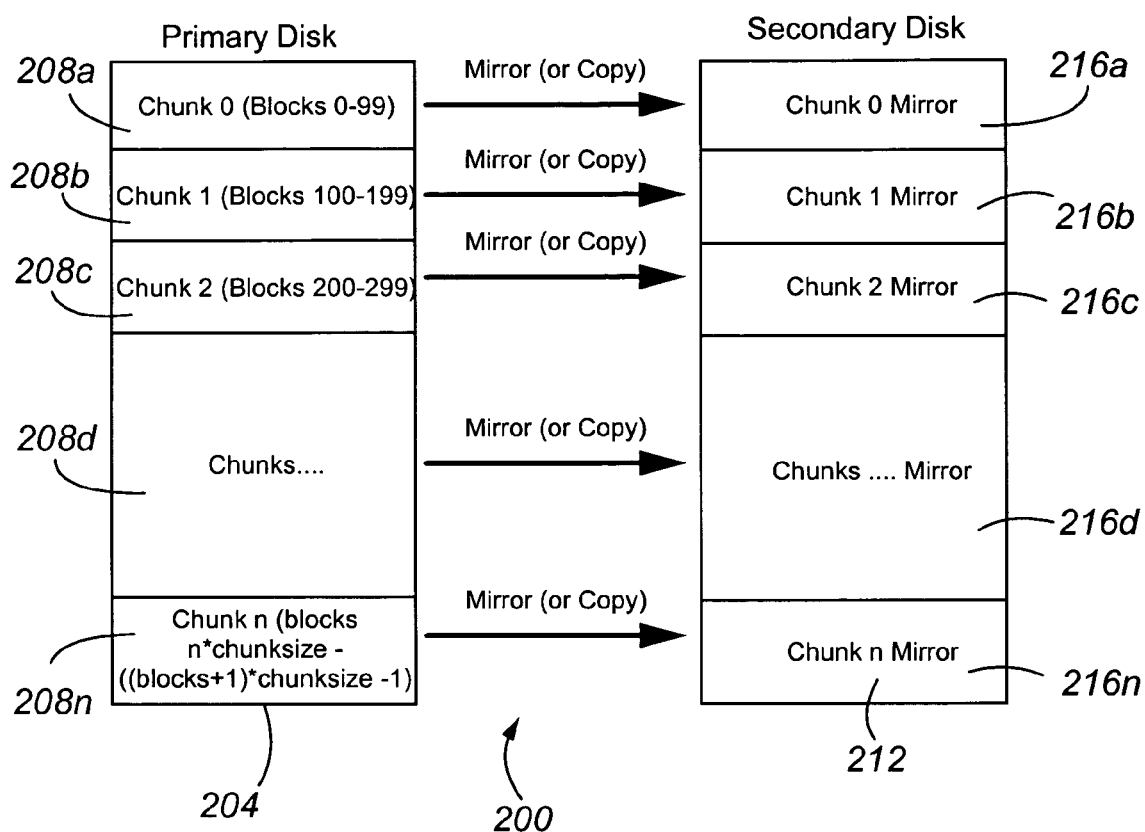
FIG. 2 depicts a data storage arrangement in accordance with a prior art RAID level 1 system.

With reference now to FIG. 2, an arrangement of data according to a mirrored RAID level 1 data configuration in accordance with the prior art is illustrated. As shown in FIG. 2, RAID 1 uses a primary disk 204 for storing primary copies 208a-208n of data chunks. The RAID 1 system additionally includes a second data storage device 212 for storing mirrored copies 216a-216n of the primary copies 208a-208n that are maintained on the primary data storage device 204. That is, for each primary copy of data 208 on the primary data storage device 204, there exists a mirrored copy 216 on the secondary data storage device 212. RAID 1 configurations such as the example prior art storage system 200 therefore provide redundancy if one of the storage devices 204 or 212 fails. Specifically, if the primary storage device 204 fails, the data that was stored on the primary storage device 204 can be retrieved from the secondary storage device 212, either for use by a host or to rebuild a primary copy of the data on a replacement primary storage device 204. Similarly, if the secondary storage device 212 fails, data can be retrieved from the primary storage device 204, for example for use by a host, or to create new mirrored copies 216 on a replacement secondary storage device 212. Although this arrangement provides data redundancy, it does not provide improved IO performance as compared to a data storage scheme using a single data storage device of like performance to data storage devices 204, 212. In addition, conventional RAID 1 arrays must be deployed using arrays containing even numbers of storage devices such that each primary storage device 204 is paired with a secondary storage device 212.

Figure 3:
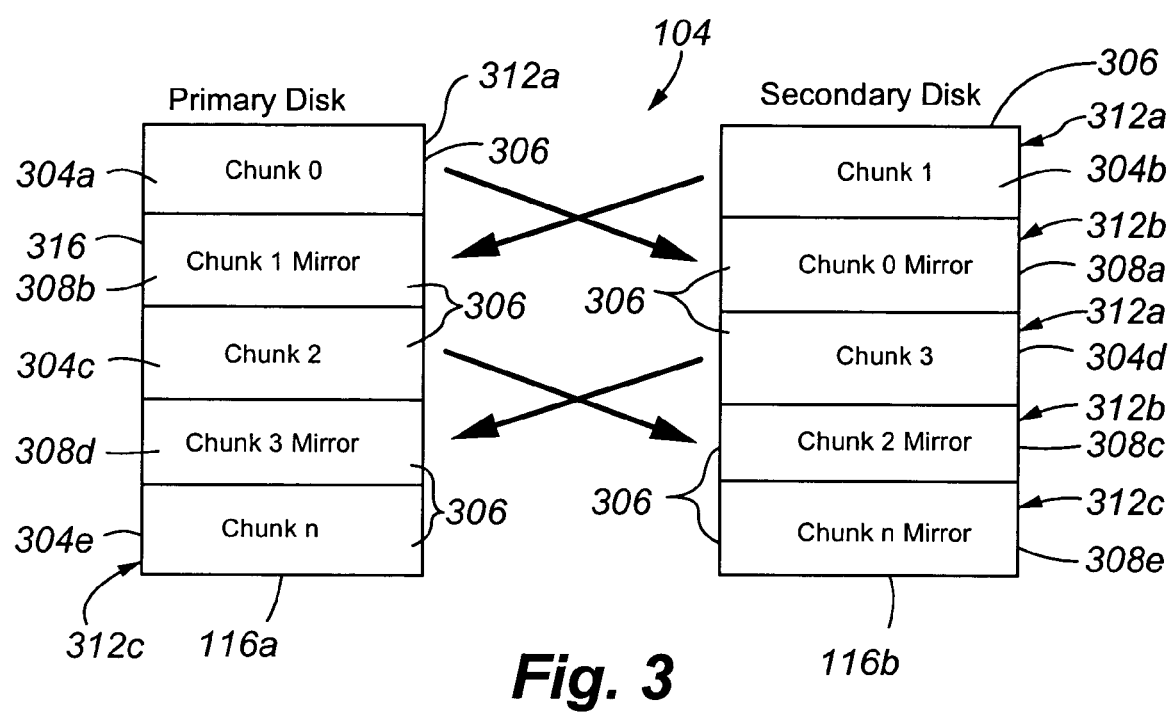
FIG. 3 depicts a data storage arrangement in accordance with embodiments of the present invention.

With reference now to FIG. 3, an example of the distribution of data within a data storage system 104 in accordance with embodiments of the present invention having two storage devices 116a and 116b is illustrated. As used herein, a primary chunk of data is the copy of a data chunk that is actually read from a storage device 116 in response to a read request including that chunk of data while the data storage system is in a normal operating mode (i.e., while all storage devices 116 are fully operational). In particular, primary data chunks 304 are stored in strips 306 on both the primary storage device 116a and the secondary storage device 116b. The size of the strips 306 are dependent on hardware implementation and convenience. In addition, mirrored copies 308 of data are stored in strips 306 on both of the storage devices 116a-b. Accordingly, primary 304 and mirrored 308 copies of data are distributed among both storage devices 116a-b.

More particularly, the chunks of data 304, 308 are arranged so that each primary chunk of data 304 is stored on a different storage device 116 than the mirrored chunk 308 to its corresponding primary chunk 304. For example, as shown in FIG. 3, the primary copy of data chunk 0 304a is stored on the primary storage device 116a, while the mirrored copy of data chunk 0 308a is stored on the secondary data storage device 116b. Similarly, the primary copy of data chunk 1 304b is stored on the secondary data storage device 116b, while the mirrored copy of data chunk 1 308b is stored on the primary storage device 116a. As a result, even if one of the storage devices 116 fails, either a primary copy or a secondary copy of the data that has been stored on the failed storage device 116 will be available on the other storage device 116. That is, data redundancy is provided.

In addition, embodiments of the present invention may at least partially interleave primary data chunks 304 and mirrored data chunks 308. Furthermore, the interleaving of data chunks or strips 306 within a data storage device 116 may be coordinated among all of the data storage devices 116 within the data storage system 104 to create at least some stripes 312a containing all primary copies of data and at least some stripes 312b containing all mirrored copies of data. As can be appreciated by one of skill in the art, a stripe of data 312 generally corresponds to a strip 306 of data on each data storage device 116 within an array. As can further be appreciated by one of skill in the art, data strips 306 within a stripe 312 may be physically located in like physical locations across the individual storage devices 116 within the array, although such an arrangement is not required. Still further, it can be appreciated that a strip 306 on a data storage device 116 provides an amount of storage space corresponding to or required by a chunk of data. Accordingly, the terms strip and chunk refer to like amounts of data. As used herein, a chunk is a defined amount of data, while a strip 306 is a segment of a storage device 116 that contains or is capable of containing one chunk of data. For example, the amount of data contained in a chunk and that can therefore be stored in a strip is 64 kilobytes. However, as can be appreciated by one of skill in the art, the size of a data chunk is somewhat system dependent and can be chosen to balance various considerations. Additional examples of chunk sizes include 16 kilobytes or 32 kilobytes, although other chunk sizes may be used.

The distribution of primary data chunks 304 across the storage devices 116a-b of the data storage system 104 can provide improved IO performance. In particular, because the limiting factor in connection with IO operations is typically the time required to access the data storage media and retrieve (or write) data within a storage device 116, and because the bandwidth or data transfer capacity of other components, such as the controller 120 or the bus or network 112 interconnected to the data storage system 104 is typically much greater than the storage device 116 access time, IO performance can be improved by spreading IO tasks among a number of storage devices 116. Embodiments of the present invention that provide for the interleaving of primary copies of data chunks 304 and secondary or mirrored copies of data chunks 308 can also improve IO performance by reducing or eliminating the overhead required by a lookup table or other mechanism for indexing data chunks 304, 308.

In the example of FIG. 3, the last illustrated strip 306 of each storage device 116a and 116b, containing chunks 304e and 308e, respectively, comprise a stripe 312c that contains both a primary chunk of data (chunk 304e) and a mirrored chunk of data (chunk 308e). This is the result of there being an odd number of strips available for data chunks 304, 308 in the example illustration. However, as can be appreciated by one of skill in the art, such a situation need only arise when the storage devices 116a and b are entirely full and the storage devices 116a and b have been divided into an odd number of strips. Furthermore, in connection with a typical data storage device 116 and strip size, the amount of data contained in such a stripe would be small. In accordance with other embodiments of the present invention, a data storage system 104 having two storage devices 116a and b may divide those devices 116 into an even number of strips in order to obtain stripes that alternate between stripes containing primary copies of data and stripes containing mirrored chunks of data.

Figure 4:
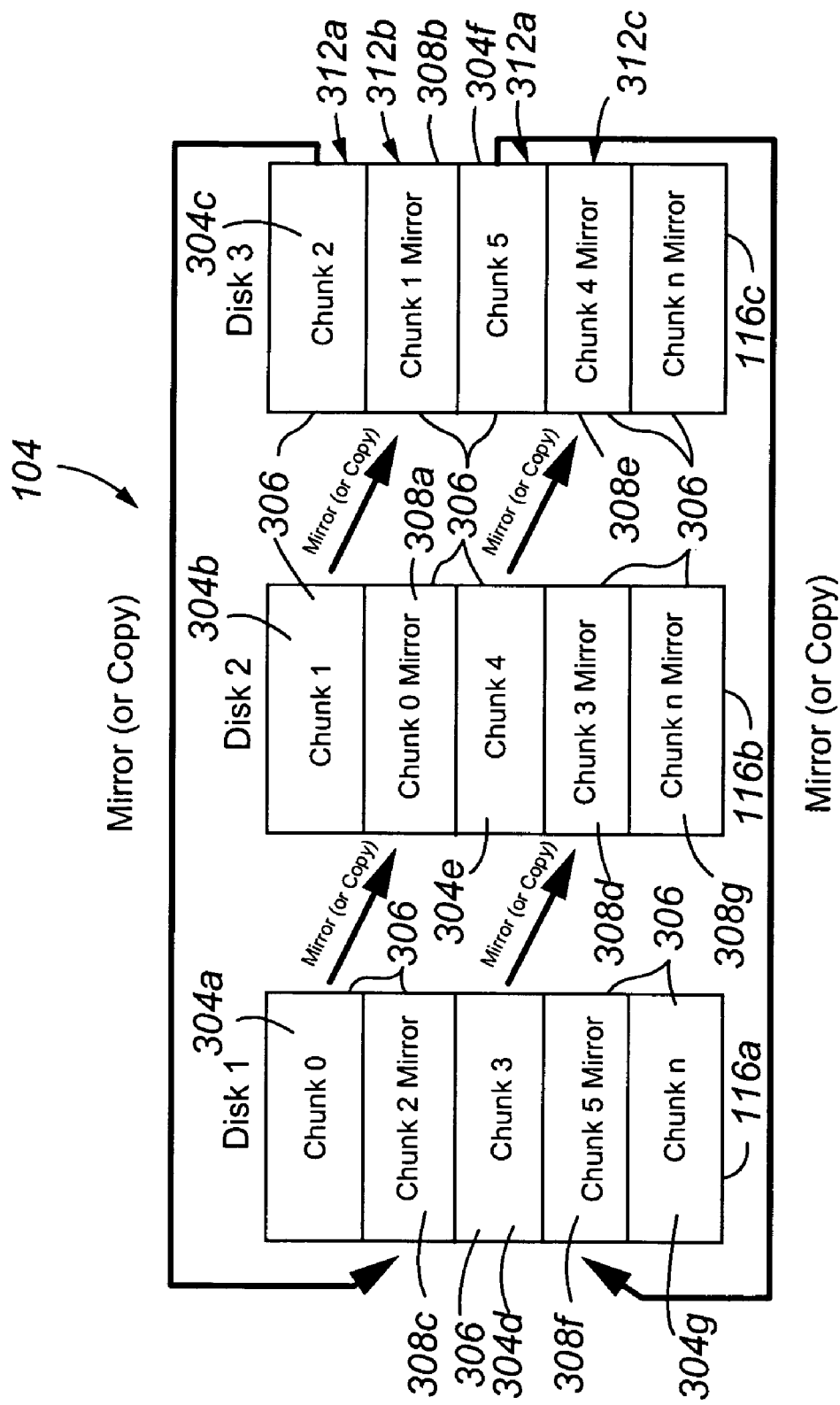
FIG. 4 depicts a data storage arrangement in accordance with other embodiments of the present invention.

With reference now to FIG. 4, an example data storage system 104 in accordance with further embodiments of the present invention is illustrated. According to this example, three data storage devices 116a-c are included in the data storage system 104. Each storage device 116 contains primary copies of data chunks 304 and mirrored copies of data chunks 308. In addition, no one data storage device 116 contains both the primary copy 304 and the mirrored copy 308 of the same chunk of data. Accordingly, no data is lost if one of the data storage devices 116 fails.

In the embodiment illustrated in FIG. 4, for each primary chunk of data 304a, 304d and 304g stored in the first data storage device 116a, a mirrored copy of that data chunk 308a, 308d and 308g is stored on the second data storage device 116b. Likewise, for each primary copy of data 304b and 304e stored on the second data storage device 116b, a mirrored copy 308b and 308e of that data is stored on the third data storage device 116c. As can be appreciated by one of skill in the art from the present disclosure, the pattern of storing a primary copy of data chunks on a data storage device 116 and storing the mirrored copy of those data chunks on a next storage device 116 can continue until the last storage device is reached.

In the example of FIG. 4, the last storage device is the third storage device 116c. The last storage device contains a number of primary copies of data chunks 304c and 304f. Mirrored copies 308c and 308f of the primary data chunks 304c and 304f are stored on the first data storage device 116a. Accordingly, it can be appreciated that data storage systems 104 in accordance with embodiments of the present invention can provide data mirroring, even in connection with an odd number of data storage devices 116. In the example as illustrated in FIG. 4, the total number of strips 316 available on each of the data storage devices 116 is odd. As a result, the last data strip 306 of the third data storage device 116c would either be empty, or as shown in the figure, contain a second mirrored copy of a data chunk. However, as can be appreciated by one of skill in the art, such a situation would only arise where the total number of strips 306 across all of the storage devices 116 is odd and the data storage system 104 is entirely full.

FIG. 4 also illustrates a data storage system 104 in which data is generally striped across the data storage devices 116 such that stripes 312a containing primary copies of data chunks 304 are interleaved with stripes 312b containing mirrored copies of data chunks 308. As with the previous example, interleaving stripes 312 in this way can reduce or eliminate overhead associated with a lookup table or algorithm required in order to index data stored in the system.

Aspects of the operation of the data storage system 104 in accordance with embodiments of the present invention in response to IO operations are now described. In particular, the following assumptions may be made: Let "b" be the first block of a host IO operation, either read or write, relative to the beginning of user-addressable space. As used herein, a block is the smallest quantity of data operated on by the system. Furthermore, a chunk of data is typically comprised of an integer number of blocks. Let "n" be the number of storage devices 116 in the array. Let "c" be the size of the strips as an integer number of blocks. Assume that user addressable space starts at block 0 on the physical storage devices 116.

Figure 5:
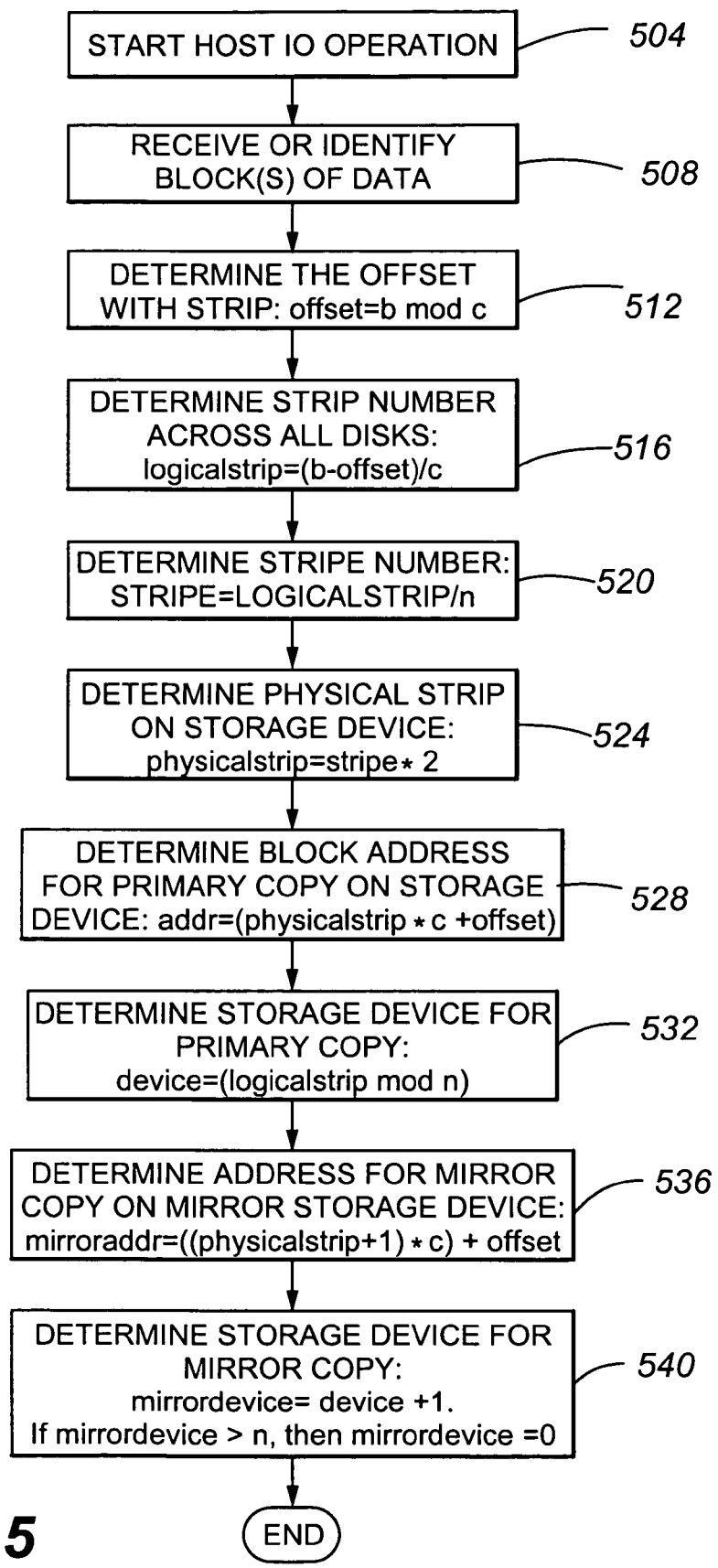
FIG. 5 is a flowchart depicting aspects of the operation of a data storage system in connection with embodiments of the present invention.

Taking the above assumptions, and with reference now to FIG. 5, the host input/output (IO) operation is started (step 504), and a block of data (b) is received or identified (step 508). The offset (from the beginning of the user addressable space) with strip is determined using the expression: offset=b mod c (step 512). The offset is then used to determine the logical strip number (across all disks) using the expression: logicalstrip=(b−offset)/c (step 516). The stripe number is calculated from the expression: stripe=logicalstrip/n (step 520). At step 524, the physical strip on the storage device is obtained using the expression: physicalstrip=stripe*2. The block address for the primary copy of a chunk of the data can then be determined using the expression: ADDR= (physicalstrip*c)+offset (step 528).

The storage device of the block for the primary copy, where the first storage device is index 0, is determined from the expression: device=(logicalstrip mod n) (step 532). The address for the mirror copy on the mirror storage device is: mirroraddr=((physicalstrip+1)*c)+offset (step 536). Finally, the storage device of the block for the mirror copy is given by the expression: mirrordevice=device+1, where mirror device equal 0 if mirror device is greater than n (step 540).

The operations described in connection with FIG. 5 are an example of how the location for data can be determined when a single block of data is received. If the host input/output operation involves multiple blocks of data, the process can be iterated. More particularly, the IO operation can be broken down into strip aligned strip sized pieces using the following process:

---

```
Let "l" be the length of the host operation in blocks
Let "cb" be the current block within the host operation -
temporary working space
Let "rl" be the remaining length to be processed of the
original host operation
Let "sl" be the chunk length of the broken-down operation
cb = b
rl = l
while cb < (b + l)
do
    -> determine length of the sub-chunk, but don't exceed
    strip size
    sl = rl
    if (sl > c) then sl = c
    -> Adjust length of sub-chunk if current block isn't
    aligned to strip sizes
    if ( ((cb + sl) mod c) <> 0 ) then sl = sl − ((cb +
    sl) mod c)
    - We now have a length for the sub-chunk, so we adjust the start
    blocks
    - Determine the physical address for the primary and mirror
    and the
    - Associated storage device based on "cb" as the address.
    - Issue the IOs to the storage device
    - Adjust the remaining length and start block for the next
    sub-chunk
    rl = rl − sl
    cb = cb + sl
until done
```

---

As can be appreciated by one of skill in the art after consideration of the present description, a process in accordance with embodiments of the present invention may distribute primary copies of data chunks 304 across all the data storage devices 116 in a data storage system 104, and therefore can distribute loads associated with IO operations across multiple data storage devices 116, improving IO performance as compared to systems in which IO operations are performed with one storage device (or a fewer number of storage devices in a comparable system in accordance with embodiments of the present invention). The process also ensures that no primary chunk of data 304 is stored on the same data storage device 116 as the mirrored chunk of that data 308, to provide protection against data loss if one of the data storage devices 116 should fail. It can further be appreciated that embodiments of the present invention can provide for the interleaving of stripes 312 across the data storage devices 116 between stripes containing primary copies of data chunks 304 and stripes containing mirrored copies of data chunks 308, to simplify the organization of an access to data.

Figure 6:
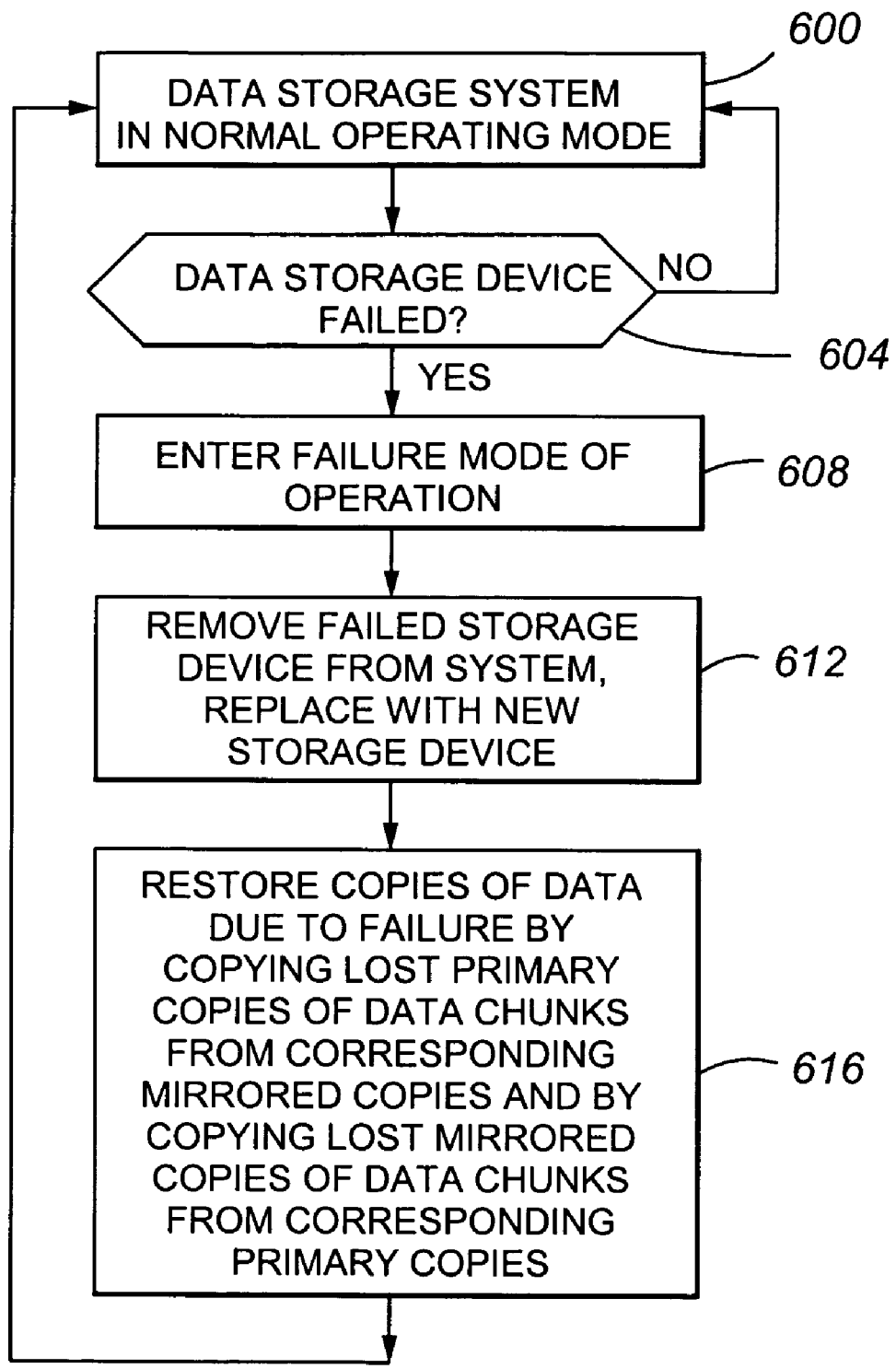
FIG. 6 is a flowchart depicting additional aspects of the operation of a data storage system in accordance with embodiments of the present invention.

With reference now to FIG. 6, aspects of the operation of embodiments of the present invention in connection with the failure of a storage device 116 included in a data storage system 104 are illustrated. Initially, at step 600, the data storage system 104 is in a normal operating mode. In the normal operating mode, data included in write operations may be distributed among the storage devices 116 as described in connection with FIG. 5, and primary copies of data chunks are read from storage devices 116 in response to read requests involving selected data chunks. At step 604, a determination is made as to whether a data storage device 116 within the data storage system 104 has failed. If no data storage device 116 has failed, the process returns to 600, and the data storage system 104 continues in the normal operating mode.

If a data storage device 116 has failed, the system 104 enters a failure mode of operation (step 608). In the failure mode of operation, all of the data that was stored on the data storage system 104 continues to be available, for example to a host 108. That is, in response to the failure of a single data storage device 116, a system 104 in accordance with embodiments of the present invention enters the failure mode, in which all of the data stored in the data storage system 104 continues to be available. If more than two data storage devices 116 fail, then the system 104 will typically become unavailable, and data will usually be lost.

After the system 104 has entered the failure mode of operation, the technician may remove the failed storage device 116 from the system 104 and replace the failed storage device 116 with a new storage device 116 (step 612). Copies of data lost due to the failure are then restored by copying lost primary copies of data chunks from corresponding mirrored copies of such data chunks stored on the other storage device or devices and by copying lost mirrored copies of data chunks from corresponding primary copies of such data chunks stored on the other storage device or devices 116 (step 616). After the restore operation is complete, the data storage system 104 may return to normal operating mode (step 600).

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for distributing data among disk drives of a storage array, comprising:

receiving a first block b of data as part of a host input/output operation;

determining an offset from the beginning of user addressable space, wherein the offset is equal to b mod c, where c is the size of the strips in the disk drives of the storage array as an integer number of blocks;

determining a logical strip number across all disks, wherein the logical strip is equal to (b-offset)/c;

determining a stripe number, wherein the stripe number is equal to the logical strip divided by n, where n is the number of disk drives in the storage array;

determining a physical strip on a storage device, wherein the physical strip is equal to stripe*2;

determining a block address for a primary copy of the first block of data, wherein the block address for the primary copy is equal to (physical strip*c)+offset;

determining a disk drive for the primary copy of the first block of data, wherein the disk drive for the primary copy is equal to (logical strip number mod n), where a first disk drive is index 0;

determining a block address for a mirror copy of the first block of data, wherein the block address for the mirror copy is equal to ((physical strip+1)*c)+offset;

determining a disk drive for the mirror copy of the first block of data, wherein the disk drive for the mirror copy is equal to the disk drive for the primary copy+1, where the disk drive for the mirror copy is equal to 0 if the mirror device calculation results in a value greater than a total number of disk drive in the storage array;

storing the primary copy of first block of data on a first disk drive, wherein the first disk drive is the determined disk drive for the primary copy;

storing the mirror copy of said first block of data on a second disk drive, wherein the second disk drive is the determined disk drive for the mirror copy;

storing a primary copy of a second block of data on said second disk drive; and storing a mirrored copy of said second block of data on one of said first disk drive and a third disk drive.

2. The method of claim 1, further comprising:

receiving a command at said storage array to read said first and second blocks of data, wherein in a first mode of operation said first block of data is read from said first disk drive and said second block of data is read from said second disk drive, and wherein in a second mode of operation said first and second blocks of data are read from one of said first and second disk drives.

3. The method of claim 2, wherein said first mode of operation comprises a normal mode of operation, and wherein said second mode of operation comprises a failure mode of operation.

4. The method of claim 3, further comprising: in response to a failure of one of said first and second disk drives:

replacing said failed disk drive; and rebuilding said primary and mirrored copies of data that had been stored on said failed disk drive on said replacement disk drive by copying said data from at least one other disk drive in said array, wherein data stored on said replacement disk drive as a primary copy of said data is copied from a mirrored copy of said data on at least one other disk drive, and wherein data stored on said replacement disk drive as a mirrored copy of said data is copied from a primary copy of said data on at least one other disk drive.

5. The method of claim 4, wherein said storage array comprises more than two disk drives, wherein said rebuilding said primary and mirrored copies of data stored on said failed disk drive on said replacement disk drive comprises copying said data from at least two other disk drives.

6. The method of claim 1, wherein said blocks of data are written to said disk drives in stripes, wherein any selected stripe of said disk drives contains either a primary copy of a block of data or a mirrored copy of a block of data but not both a primary copy of data and a mirrored copy of data.

7. The method of claim 1, wherein said storage array comprises two disk drives, wherein said mirrored copy of said second chunk of data is stored on said first disk drive.

8. The method of claim 7, further comprising:

storing a primary copy of a third block of data on said first disk drive;

storing a mirrored copy of said third block of data on said second disk drive;

storing a primary copy of a fourth block of data on said second disk drive; and storing a mirrored copy of said fourth block of data on said first disk drive.

9. The method of claim 1, wherein said storage array comprises three disk drives, wherein said mirrored copy of said second block of data is stored on said third disk drives, said method further comprising:

storing a primary copy of a third block of data on said third disk drive;

storing a mirrored copy of said third block of data on said first disk drive;

storing a primary copy of a fourth block of data on said first disk drive; and storing a mirrored copy of said fourth block of data on said second disk drive.

10. The method of claim 1, wherein each strip contains a chunk of data, wherein said storage array contains n drives, wherein said primary copies of a first n chunks of data are stored in a first available strip of said disk drives, and wherein said mirrored copies of said first n chunks of data are stored in a next available strip of said disk drives.

11. The method of claim 1, wherein each stripe across said disk drives contains only one of primary copies of data or mirrored copies of data.

12. The method of claim 1, wherein said method is implemented by a computational component comprising a computer readable storage medium containing instructions for performing the method.

13. The method of claim 1, wherein said method is implemented by a computational component comprising a logic circuit.

14. A data storage system, comprising:

a plurality of data storage devices;

a controller, operable to implement a data distribution arrangement, wherein a received first chunk of data is stored as a primary copy of data and a mirrored copy of data, wherein the primary copy of the first chunk of data stored on a first one of said plurality of data storage devices is mirrored on a second one of said plurality of data storage devices, wherein a primary copy of a second chunk of data stored on a second one of said plurality of data storage devices is mirrored on one of said first data storage device and a third one of said plurality of data storage devices, wherein at least one stripe across the plurality of data storage devices contains only primary copies of data;

wherein at least one stripe across the plurality of data storage devices contains only mirrored copies of data, and wherein one stripe only across the plurality of data storage devices contains at least one primary copy of data and at least one mirrored copy of data.

15. The system of claim 14, wherein said plurality of data storage devices consists of an odd number of data storage devices.

16. The system of claim 14, further comprising:
a controller, wherein a distribution of data across said plurality of data storage devices is controlled by said controller.

17. The system of claim 14, wherein said data storage devices comprise hard disk drives.

18. A data storage system, comprising:
a plurality of means for storing data;
means for controlling a distribution of data among said means for storing data,
wherein said means for controlling a distribution of data:
   a) determines an offset from the beginning of user addressable space according to the expression: offset=b mod c, where b is a first block of data received as part of a host operation and c is the size of strips in the means for storing data as an integer number of blocks,
   b) determines a strip number (logicalstrip) across all disks according to the expression: logicalstrip=(b-offset)/c,
   c) determines a stripe number (stripe) according to the expression: stripe=logicalstrip/n, where n is the number of means for storing data included in the plurality of means for storing data,
   d) determines a physical strip (physicalstrip) on one of the plurality of means for storing data using the expression: physicalstrip=stripe*2,
   e) determines a block address (ADDR) for a primary chunk of data according to the expression: ADDR=((physicalstrip=1)*c),
   f) determines an identity of a one of said means for storing data (device) on which a primary copy of the first block of data is to be stored according to the expression: device=(logicalstrip mod n), where a first one of the plurality of means for storing data is index 0,
   g) determines an address for a mirror copy (mirroraddr) of the first block of data according to the expression: mirroraddr=((physicalstrip+1)*c),
   h) determines an identity of a one of said means for storing data (mirrordevice) on which the mirror copy of the first block of data is to be stored according to the expression: mirrordevice=device+1, where mirrordevice is set equal to 0 if the expression for mirrordevice results in a value that is greater than n,
wherein each means for storing data contains primary copies of data chunks and mirrored copies of data chunks, and wherein no one of said means for storing data contains both primary and mirrored copies of the same chunk of data.

19. The system of claim 18, wherein said data chunks are distributed across said plurality of means for storing data in at least two data stripes containing only primary copies of data chunks interleaved with at least two mirrored copies of data chunks.

20. The system of claim 18, wherein said system comprises at least three means for storing data, wherein a first one of said means for storing data stores a plurality of primary copies of data chunks and a plurality of mirrored copies of data chunks, wherein said primary copies of data chunks stored on said first means for storing data are all mirrored on a second one of said means for storing data, and wherein said mirrored copies of data chunks stored on said first means for storing data all are mirrored copies of primary copies of data chunks stored on a third one of said means for storing data.

* * * * *